June 28, 1960 E. N. SHAWHAN 2,943,258
APPARATUS FOR IMPEDANCE MEASUREMENTS
Filed Aug. 12, 1954 5 Sheets-Sheet 1

INVENTOR.
ELBERT NEIL SHAWHAN
BY
ATTORNEYS

June 28, 1960 E. N. SHAWHAN 2,943,258
APPARATUS FOR IMPEDANCE MEASUREMENTS
Filed Aug. 12, 1954 5 Sheets-Sheet 2

INVENTOR.
ELBERT NEIL SHAWHAN
BY
ATTORNEYS

June 28, 1960    E. N. SHAWHAN    2,943,258
APPARATUS FOR IMPEDANCE MEASUREMENTS Filed Aug. 12, 1954    5 Sheets-Sheet 3

INVENTOR.
ELBERT NEIL SHAWHAN
BY
ATTORNEYS

INVENTOR.
ELBERT NEIL SHAWHAN

June 28, 1960     E. N. SHAWHAN     2,943,258
APPARATUS FOR IMPEDANCE MEASUREMENTS
Filed Aug. 12, 1954     5 Sheets-Sheet 5

INVENTOR.
ELBERT NEIL SHAWHAN
BY
ATTORNEYS

United States Patent Office 2,943,258
Patented June 28, 1960

2,943,258
APPARATUS FOR IMPEDANCE MEASUREMENTS

Elbert Neil Shawhan, Newton Square, Pa., assignor to Sun Oil Company, Philadelphia, Pa., a corporation of New Jersey Filed Aug. 12, 1954, Ser. No. 449,437

10 Claims. (Cl. 324—57)

This invention relates to methods and apparatus for impedance measurements and has particular reference to the measurement of small impedance changes particularly when the impedance which is measured is required to be remote from electronic measuring apparatus.

As will appear hereafter, the word "measurement" is used in a quite broad sense, not limited to the ascertainment of numerical values, but including the production of outputs which are functionally related to the impedance and utilized for observation, recording, control, or like purposes. For simplicity in describing the invention, reference will be primarily made to measurements of small capacitances or small changes in capacitances though it will become evident that the invention is equally applicable to the measurement of impedances and small changes in impedances quite generally.

Numerous occasions arise for the measurement of capacitances but, in general, it has been necessary to associate closely with the capacitances to be measured electronic apparatus which gives rise to signals which are functions of the capacitances. For example, it has been recognized that an ideal method for measuring very small capacitances or changes in capacitances involved the utilization of the capacitance undergoing measurement as a tuning element of an oscillator, whereby high sensitivity is secured by producing beats susceptible to detection and measurement. In other cases, capacitances are measured by their incorporation in bridges, or other circuits, which are activated by alternating currents. In all such cases, vacuum tubes and associated apparatus must be located closely adjacent to the capacitances undergoing measurement or precautions must be taken to insure that any more remote connecting devices do not introduce spurious capacitances which would be added to that to be measured. In particular, troubles arise where the measurement of a capacitance is used for the detection of a level of material or for the determination of some quality of a material by utilization of changes in its dielectric constant or its conductivity. Such measurements, for example, are sometimes required to be made where the condenser providing the capacitance to be measured is necessarily at a quite high temperature, so high as to preclude exposure thereto of any but highly specially designed electronic equipment. If an attempt is made to provide a remote connection, as for example by a coaxial cable, such connection will introduce a capacitance of its own which is so large that minor changes due to temperatures or mechanical displacements will cause variations in capacitance which may be much greater than the variations requiring measurement. For example, a coaxial cable may have a distributed capacitance of about 50 micromicrofarads per foot. Yet the changes in capacitance which it may be desired to measure may be of the order of less than one micromicrofarad which, for a cable of such length as may be ordinarily required, will represent only a very small fraction of the total distributed capacitance of the cable, with the result that even minor temperature changes may produce corresponding changes in the cable capacitance completely masking the changes to be detected. The general object of the present invention is the provision of methods and apparatus for making impedance measurements while practically eliminating any effects of capacitance or other impedance changes in a connecting cable or the like. In accordance with the invention, it has been found, for example, that measurements to an accuracy better than 0.1 micromicrofarad may be made through a connecting, completely conventional, coaxial cable of a length in excess of 1000 feet. The advantages of the invention will, accordingly, be apparent: not only may remote measurements be made without the presence of any vacuum tubes or other bulky or mechanically- or temperature-sensitive apparatus adjacent to the capacitance to be measured but, as will become more apparent hereafter, it is possible to utilize a single measuring apparatus with a plurality of cables running to impedances to be measured with the possibility of switching from one to the other without the necessity for making adjustments to compensate for the connecting lines. This independence of connections is also of major advantage in the making of field measurements where lengths and dispositions of cables, or the like, are subject to quite arbitrary variation. Thus, for example, the invention is applicable to geophysical prospecting work, such as seismographic work, where it is impractical to provide at a detector a substantial amount of electronic apparatus whereas there can be provided a quite small detector housing a capacitance-type pickup, or the like, together with a very minor amount of electrical circuitry.

The invention is applicable to automatic control and measurement, as will be pointed out hereafter.

The objects of the invention relate generally to the attainment of results such as described above, and the broad objects, as well as specific objects, particularly relating to details of apparatus and operation will become apparent from the following description read in conjunction with the accompanying drawings, in which.

Figure 1:
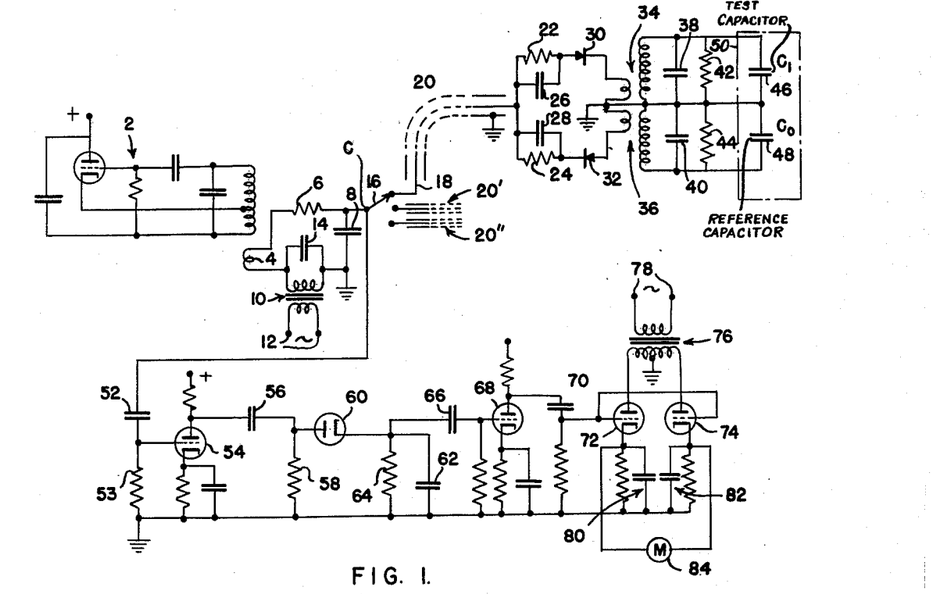
Figure 1 is a wiring diagram showing one form of apparatus provided in accordance with the invention.

Referring first to Figure 1, there is indicated at 2 an exciting oscillator which may be of any desired type but which is illustrated as a conventional Hartley oscillator. As will hereafter appear, the exciting frequency may be chosen to be most suitable for the purposes involved and in accordance with the invention the excitation may, if desired, even be at ultra high frequencies when, for example, changes in impedances to be measured occur in very small intervals of time. The output of the oscillator is coupled through the transformer secondary coil 4 into a low impedance circuit which comprises in series with the secondary 4 a resistor 6, a condenser 8, and the secondary of a transformer 10 which is excited with an alternating switching voltage applied at terminals 12. This switching voltage may, in many commercial applications, be satisfactorily at 60 cycle frequency, but it will be understood that if relatively high frequency switching is desired the switching signal input may be derived from an oscillator, multivibrator, or other source.

In accordance with the invention, the switching frequency is relatively low in comparison with the exciting frequency derived from the oscillator 2, the switching frequency being of sufficient magnitude that its period is short compared with variations in the impedance to be measured. As the description proceeds, it will become evident that the frequencies involved may have a quite tremendous range.

A condenser 14 shunts the secondary of transformer 10 and provides a low impedance bypass for the high frequency exciting signals while presenting a relatively high impedance path to the switching signals. The junction of resistance 6 and condenser 8 provides a terminal C which provides the output signal to be subjected to measurement. Indicated at 16 is a switch which may connect the terminal C with any one of a number of conductors 18 of coaxial cables indicated at 20, 20′ and 20″. The switch is so illustrated since it indicates the possibility of utilizing the same tube circuits for the making of selective measurements of variable impedances. Only the apparatus connected to the cable 20 is illustrated in detail, it being understood that similar apparatus might be connected to any number of similar cables for switching into the circuit.

The sheath of cable 20 is grounded and its central conductor 18 is connected to a circuit which comprises in series a resistor 22, a diode 30, the primaries of transformers 34 and 36, a diode 32, and a resistor 24. The resistors 22 and 24 are, respectively, shunted by condensers 26 and 28 which provide low impedance bypass for the exciting frequency from the oscillator 2 but relatively high impedance to the switching frequency. The connection between the primaries of the transformers 34 and 36 is grounded. The diodes at 30 and 32 may be of crystal type and if of this type they are very small and rugged. It will be noted that the diodes 30 and 32 are oppositely connected to the cable conductor 18. As will appear, this results in selective switching at the transformers 34 and 36.

The secondaries of the transformers 34 and 36 are connected to similar separate circuits both grounded as indicated. Each of these comprises a condenser, 38 and 40, respectively, shunting the secondary of its transformer. Resistors 42 and 44 respectively shunt the condensers 38 and 40. Indicated at 46 and 48 are two condensers which are in parallel with the condensers 38 and 40 and represent, respectively, the capacitance to be measured and a reference capacitance, the former being indicated as having a capacitance $C_1$, and the latter as having a capacitance $C_0$. To indicate that these two capacitances are located under comparable physical conditions they are shown as surrounded by the chain line 50.

As an example, let it be supposed that the level of a liquid or a bed of discrete solid particles is to be determined and that the capacity 46 is constituted by a tube immersed in the liquid or bed and arranged to receive the same, with a second plate of the condenser constituted by a rod or wire extending axially through the tube. It will be evident that such an arrangement will provide a capacitance which will vary due to changes of liquid or bed level which provide changes in the amount of dielectric, other than air or other gas, between the condenser elements constituted by the tube and the central electrode. A measurement of capacitance would then be a measure of liquid level provided no other disturbing factors were present. However, it might well be assumed that other disturbing factors might be present in that, for example, the dielectric constant of the liquid or other material might change with temperature or pressure, the dimensional characteristics of the arrangement of the tube and electrode might change with temperature or pressure, the liquid or other material itself may vary in composition, and, therefore in its dielectric constant, during the carrying out of a process, or the like. In such case, there would be provided to constitute the condenser 48 a similar condenser-providing cell having the same dimensions as that previously mentioned but at all times completely filled with the liquid or other material and subject to the changes of composition, temperature, pressure or other variables. Accordingly, a variation of $C_1$ with respect to $C_0$ would essentially be dependent solely upon liquid or bed level.

As another example, there might be considered a situation in which what was to be detected was merely variation in the composition of a processed liquid which could serve as a dielectric. In such case, the liquid undergoing change may be made the dielectric of a condenser corresponding to 46 and having any suitable physical form involving parallel plates, concentric conductors, or the like. The standard condenser against which comparison may be made might comprise a closed capacity cell of the same physical dimensions containing a liquid composition which might be regarded as providing a standard for reference. If such a cell is immersed in the liquid being processed, both would involve, at all times, essentially the same temperatures and changes in physical dimensions of the cells. Pressures existing may be equalized in the cells. Relative variations of capacitance would then represent essentially solely changes in the liquid composition.

Many other similar arrangements may be readily imagined for utilization in connection with the making of process measurements or other measurements. For example, various liquids have substantial changes in their dielectric constants effected by pressure or temperature changes. Pressure and temperature may be correspondingly measured in such cases by the provision of suitable cells the capacitances of which vary with the variables to be measured. In such cases, standards of capacitance may be provided in any suitable fashion, either by similar cells not subjected to the same changes of variable, or merely by fixed or adjustable condensers of conventional types.

Furthermore, capacitances as such may be measured which may, for example, vary in mechanical dimensions, as by changes in separation of condenser plates due to mechanical movements to be measured or resulting from sound or seismic waves, or the like.

Furthermore, while capacitances have been principally referred to, it will shortly become evident that instead of capacitances at 46 and 48 there may well be impedances of almost any conceivable type. For example, inductances may be provided which vary with positions of cores or changes in core characteristics due to pressure, temperature, or the like. Furthermore, under some conditions, and utilizing ultra high frequency excitation, changes may even be provided in resonant lines, or the like, due to variations in process or other variables.

Figures 2, 3:
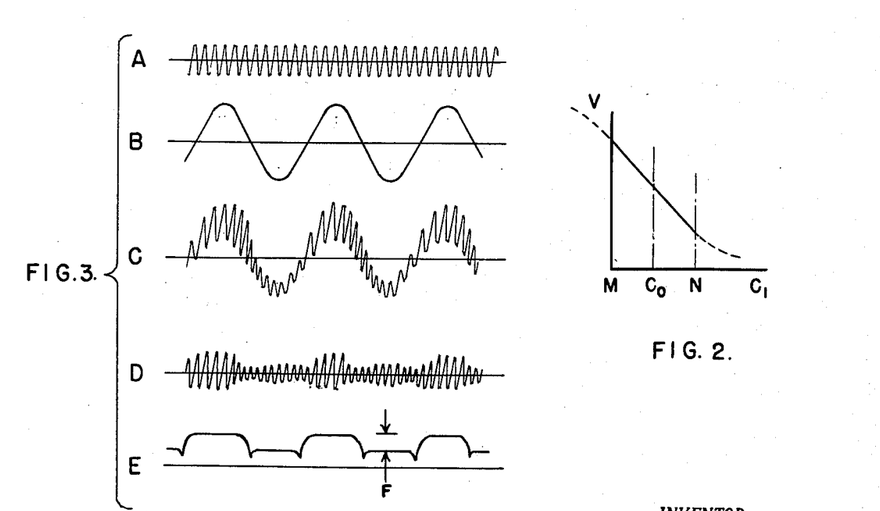
Figure 2 is a graph illustrative of the variation of a signal voltage appearing in the circuit of Figure 1 with respect to capacity changes.
Figure 3 comprises a series of graphs illustrative of the operation of the circuit of Figure 1.

Assuming capacitances as illustrated in Figure 1, these constitute tuning elements in combination with the condensers 38 and 40 for the inductances or other impedances appearing at the terminals of the secondaries of the transformers 34 and 36. Considering first the circuits so far discussed, and for the sake of simplicity considering only the upper circuit involving condenser 46 and assuming diode 30 short-circuited, it will be evident that presented to the voltage divider constituted by resistor 6 and condenser 8 there is a tuned circuit such that, assuming a constant input to transformer secondary 4 from oscillator 2 there will appear at terminal C a high frequency potential which will be dependent upon the capacitance $C_1$ and will have the form of the usual resonance curve as a function of this capacity. Operation will, usually, by confined to one side of such a resonant curve and a region of operation corresponding to this is illustrated in Figure 2, in which V represents the high frequency voltage appearing at terminal C plotted against variations of $C_1$, there being a substantially linear variation involved between the limits M and N. A similar curve would apply to the lower portion of the circuit including condenser 48, and a fixed capacitance of this condenser might well be as indicated at $C_0$ in the middle of the range MN.

The actual operation in producing a signal at C may now be described. Referring to Figure 3, there is indicated at A the output of the oscillator 2 and at B the switching wave introduced at terminals 12. The relative amplitudes of these two signals are such that the amplitude of the exciting wave A is substantially less than that of the switching signal in the circuit comprising the resistor 6 and condenser 8. The sum of these two signals is imposed through the coaxial cable 20 upon the circuit including the diodes 30 and 32. Considering the opposite arrangements of the diodes, it will be evident that they conduct during opposite half cycles of the switching wave B and, consequently, one or the other of the transformers 34 and 36 is effectively out of operation during each half wave. When the diode 30 is conducting, the upper circuit, including condenser 46, is effectively in the circuit, and, accordingly, its characteristics are reflected in the high frequency content of the potential appearing at C. Similarly, when the diode 32 is conducting, the lower half of the circuit, including condenser 48, is effective to determine the high frequency component of the potential appearing at C. The result, then, is a switching action in which on alternate half cycles the capacitances $C_1$ and $C_0$ are effective in determining the high frequency signal component appearing at C. It will now be evident that the difference between the high frequency components produced during the successive half cycles will be substantially solely dependent upon the difference between the capacitances $C_1$ and $C_0$ provided the circuits appearing at the upper right of Figure 1 remain related to each other in substantially constant fashion. This does not necessarily mean that the corresponding components of these circuits must be absolutely identical, though that is desirable from the standpoint of their reactions to such changes as might occur due, for example, to temperature variations or such other disturbing matters as might occur. It will be evident, considering the particular elements connected to the right-hand end of the coaxial cable, that these may be readily chosen so as to have completely negligible variations with respect to each other as contrasted with the expected variations of capacitance $C_1$ with respect to capacitance $C_0$. The various pairs of elements may be so constructed as to have substantially identical dimensions and may be housed in a common casing so as to be influenced substantially identically by external conditions.

The connections to the condensers 46 and 48 may be short and identical. Actually, all of the apparatus to the right of the cable end may be, except, possibly, for the condensers 46 and 48, very small in physical dimensions. The matter of remote connection would be normally that of primary concern, but in accordance with the present invention, this is a matter of no substantial concern inasmuch as due to the switching action the same cable serves for the feed of both of the condenser circuits and changes in the condition of the cable could only affect the results if the changes varied more rapidly than the length of the period of the switching wave. Since normally the conditions encountered which might be disturbing would arise from temperature changes or changes in the physical arrangement of the cable, such changes being relatively slow may be completely eliminated as to their effects and it has been found that even cable lengths of thousands of feet do not preclude the making of capacitance measurements to an accuracy better than 1 micromicrofarad. The effect of change of capacitance or other characteristics of the cable is merely to shift to the right or left the graph pictured in Figure 2. But this shift occurs equally with respect to both capacitances $C_1$ and $C_0$ so that the effect is negligible so long as operation is maintained in a linear region of the characteristic.

It will be obvious that numerous detecting arrangements may be provided to respond to the conditions which appear at the terminal C. To indicate what is involved, and the operation of a highly satisfactory detecting and measuring circuit, reference may be first made to the curve C in Figure 3 which illustrates the voltage appearing at the terminal C under a typical condition. It will be noted that the curve illustrated comprises the sum of the switching signal wave added to a high frequency excitation wave which is of different amplitude in the positive and negative half cycle periods of the switching wave. It may be assumed, for example, that the upper circuit including the condenser 46 is switched by conductivity of its diode into the circuit during the positive half cycles and, consequently, the high frequency component of the wave C during the positive half cycles represents effect at terminal C of the capacitance $C_1$. Similarly, the amplitude of the high frequency component during the negative half cycles corresponds to the effect of the capacitance $C_0$. The function of the detecting and measuring circuit is, then, to measure the difference in amplitudes of the positive and negative half cycle high frequency components.

To accomplish this end, the terminal C is connected through condenser 52 to a conventional amplifier comprising the triode 54. The output from the anode of this triode is delivered through condenser 56 which is connected to ground through resistance 58. The grid of triode 54 is connected to ground through resistance 53. The circuit constants of the combination 52, 53 and 56, 58 are so chosen as to pass the high frequency component of the wave C while substantially eliminating the low frequency switching component at the connection to the anode of the diode 60, the cathode of which is connected to ground through the parallel arrangement of condenser 62 and resistance 64. The time constant of the circuit 62, 64 is so chosen as to bypass to ground substantially all high frequency components appearing in the output from the diode while, at the same time, not providing sufficient bypass to ground to suppress the pulses which result from the rectifying action. The curve D in Figure 3 represents the signal appearing at the anode input to the rectifier 60, while the curve at E represents the potential appearing at the ungrounded end of condenser 62. As will be evident from E, the difference of amplitude of the successive half-cycle pulses indicated at F corresponds to the difference in amplitude of the high frequency signals at C resulting from the switching action and the difference in capacitances at $C_1$ and $C_0$.

The measurement of the difference F in amplitude is effected by connecting the ungrounded side of condenser 62 through condenser 66 to the grid of the amplifier triode 68, the output of which is fed through condenser 70 to the grids of a pair of triodes 72 and 74 the anodes of which are connected to the opposite terminals of the secondary of a transformer 76 which is fed at its input terminals 78 from the same source as supplies the switching voltage at terminals 12. The cathodes of the triodes 72 and 74 are returned to ground through the filter arrangements 80 and 82 which comprise condensers on which direct potentials are accumulated. A meter 84 in the form of a voltmeter is connected between the cathodes of triodes 72 and 74. As will be evident from the connections described, there is thus provided a synchronous detection arrangement so that the meter 84 will indicate a voltage which is proportional to the amplitude difference F. It has been found that, with suitable choices of circuit constants to cause the tuned circuits to operate on a substantially linear portion of the characteristic illustrated in Figure 2, the meter 84 will have a substantially linear response to the variations of capacitance $C_1$ with respect to the reference capacitance $C_0$. Thus, with preliminary calibration, the complete circuit provides highly accurate and linear measurement of the capacitance difference.

While the type of circuit described is of very general applicability, attention may be called particularly to the fact that the assembly at the sensing end of the coaxial cable 20 may consist of elements capable of operating at quite high temperatures so that capacitance measurements may be made at corresponding temperatures to determine, for example, levels of liquids or pseudo-liquids which may be at quite high temperatures which would normally preclude the local presence of tubes and their circuits. Such conditions arise, for example, in catalytic cracking plants utilizing recirculating catalyst beds where the matter to be determined is the level of such a catalyst. Even the coaxial cable or the local end thereof may be made highly heat-resistant through the use of suitable metal with ceramic insulation. The portions of the circuit involving the vacuum tubes, transistors, or the like, may be remote and, in fact, in a processing plant the exciting and detecting portions of the circuit associated with the terminal C may be made to measure by selection at switch 16 the condition which may exist in various portions of a plant, the switch 16 being manipulated to connect the measuring means selectively with the various sensing circuits. The entire apparatus may be made to effect automatic sequential recording if the meter 84 is of a conventional recording type and the switch 16 is cyclically operated. A single chart may then contain records of numerous separate measurements.

It will now be evident that the particular natures of the capacitances provided at 46 and 48 may be of a very wide variety of types, such as those indicated above. Furthermore, the capacitances may well be replaced by any other impedances, in the form of inductances, impedance networks, lines, or even merely resistances. While for most chemical processes, the changes in capacitance at $C_1$ would be sufficiently slow so that 60 cycle current could be introduced for switching at terminals 12 and 78 and the oscillator such as represented at 2 could operate at relatively high audio frequencies, it will be evident that there is no dependence of the circuit on frequency limitations and, hence, with mere suitable choices of circuit constants as will be evident to those skilled in the art, the exciting frequency could well be in the ultra high frequency range while the switching frequency could be in the very high frequency range. In such case, the changes in the impedance to be measured may well occur at quite high frequencies with ultimate recording by a cathode ray oscillograph. Thus, for example, the changes in the impedance being measured might occur at high audio frequencies with faithful reproduction in the recording.

It may be remarked, however, that where periodic variations permit and quite long cables are involved it is desirable for simplicity of adjustment and long range of linear calibration to use exciting frequencies such that the length of the cable represents only a fraction of the wave length at the exciting frequency. This, however, is not essential if due account is taken in calibration of the effect of resonance conditions which may be introduced by the connecting cable. In a null system such as hereafter described the resonance conditions of the cable may be very effectively balanced out. If ultra high frequencies are involved at the detector, furthermore, there may be provided at a suitable distance from the detector frequency conversion of the type utilized in conventional superheterodyne receivers to give rise to a signal-responsive relatively low frequency which may be transmitted more remotely from the locus of detection. Accordingly, ultra high frequencies may be used with detection of variable conditions dependent upon variations in resonant line characteristics, including line terminations, in dimensions of wave guides or cavities, or the like.

Figure 4:
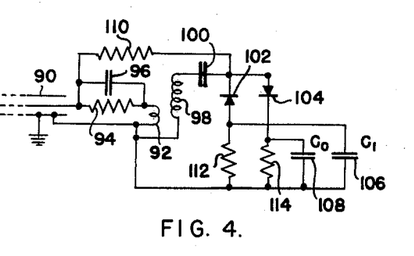
Figures 4 to 7, inclusive, are wiring diagrams illustrating alternative forms of pickups involving crystal switching.

Circuits utilizing crystal diodes for switching may take various forms. In the form illustrated in Figure 1, the switching occurs in the low impedance circuit at the detection end of the cable. Alternatively, the switching may occur in the high impedance portion of the circuit in accordance with what is illustrated in Figure 4. The cable 90, corresponding to 20 in Figure 1, terminates in the series arrangement of the transformer primary 92 and the parallel arrangement of resistor 94 and capacitor 96. The secondary of the transformer indicated at 98 delivers the exciting frequency through capacitor 100 to the oppositely arranged crystal diodes 102 and 104 which are respectively in series with the capacitances 106 and 108, one of these being the reference capacitance, and the other the capacitance to be measured. Switching signal potentials are provided by the drop across resistance 94 through resistance 110 and the resistances 112 and 114 respectively in series with the diodes 102 and 104. The exciting frequency is bypassed by capacitor 96 to avoid attenuation in resistor 94 and is applied to either condenser 106 or condenser 108 depending upon the conductivity of the diode 102 or 104 as determined by the application thereto of the switching potential. The operation is accordingly equivalent to that previously described and will give rise to the same type of signals at the detection end of the cable.

Figure 5:
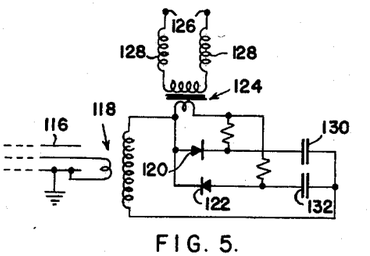
Figure 6:
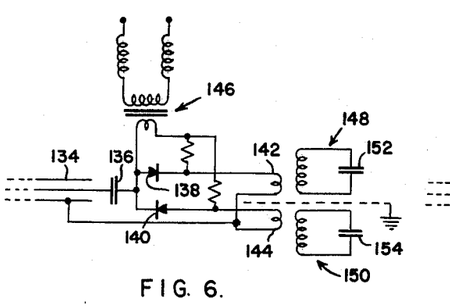

If it is not desired to have the switching signal delivered over the cable, there may be utilized one of the circuits such as illustrated in Figure 5 or Figure 6. In the former the switching is accomplished in the high impedance part of the circuit, the cable 116 delivering the exciting frequency through the transformer 118 the secondary of which is connected through the respective crystal diodes 120 and 122 to the capacitances 130 and 132 one of which is the standard and the other of which is to be measured. The switching signal is delivered from terminals 126 through the transformer 124 to produce selective conductivity of the diodes. Chokes 128 are desirably provided to prevent loss of the exciting current through the transformer.

Alternatively, the switching may be accomplished in the low impedance portion of the circuit as illustrated in Figure 6, wherein the cable 134 is connected through condenser 136 to the crystal diodes 138 and 140 which are respectively in series with the transformer primaries 142 and 144. A switching signal is provided through the transformer 146 to render the crystal diodes selectively conductive. The primaries 142 and 144 are coupled to the circuits 148 and 150 which include the capacitances 152 and 154 constituting the standard and the capacitance to be measured. The circuits 148 and 150 are tuned in the fashion described above so that operation takes place on substantially linear portions of their resonance characteristics. By the arrangements illustrated in Figures 5 and 6 there is substantial suppression of the switching signals from the cable.

Figure 7:
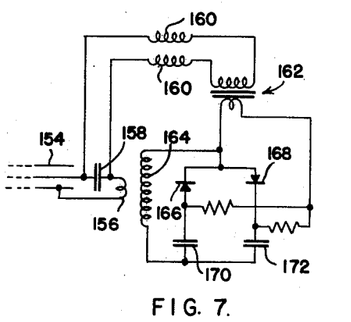

In the arrangement of Figure 7, the exciting and switching signals are both supplied over the cable 154, the exciting signal being delivered to the transformer primary 156 through the capacitor 158 which passes the exciting frequency but offers a relatively high impedance to the switching frequency. The switching signal is taken off from across this capacitor through the chokes 160, which block the exciting frequency, and the transformer 162. The exciting frequency is delivered through the transformer secondary 164 to the crystals 166 and 168 which are, respectively, in series with the capacitances 170 and 172 constituting the reference capacitance and that to be measured. The switching operation will be evident from Figure 7, there being produced at the measuring end of the cable signals such as those described in connection with Figure 1.

Figure 8:
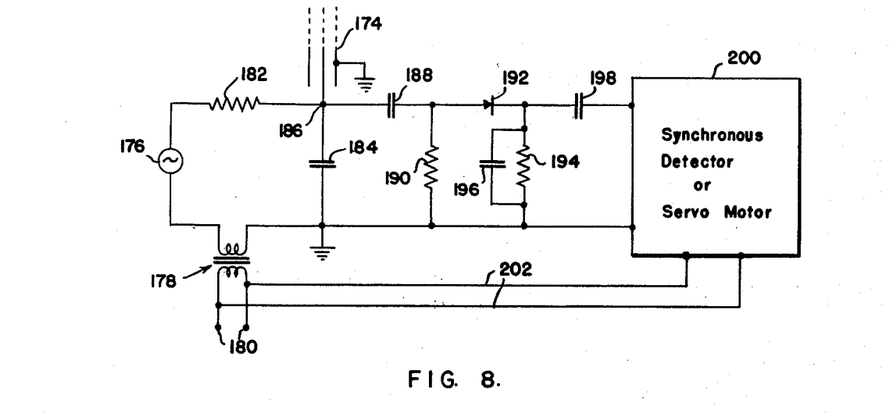
Figure 8 is a wiring diagram illustrating in simplified form a detecting or servo system applicable to the pickups of Figures 1 and 4 to 7.

To illustrate the measuring means utilizable with the detecting arrangements so far described, there is illustrated in Figure 8 a circuit reduced to its essentials and omitting in particular, such amplifying stages as may be generally desirable if the signal levels are low. The cable 174 may be taken to represent any of the cables previously described and illustrated at 20, 90, 116, 134 and 154. The exciting frequency generator is indicated at 176 and may, as previously described, take the form of any suitable oscillator giving a signal having a frequency substantially greater than that of the switching frequency. A switching signal transformer is indicated at 178 and receives its input from terminals 180. These latter terminals may in most plant uses be connected to the conventional 60 cycle power supply lines. If the detection arrangements are those of Figures 1, 4 or 7, a switching signal input as delivered from transformer 178 is used. On the other hand, if the switching signal is not to be delivered through the cable, as in the use of the detecting arrangements of Figures 5 and 6, the transformer 178 would be omitted. The exciting frequency generator 176, with or without the transformer 178 in series therewith, delivers its output through the series arrangement of resistor 182 and capacitor 184, to provide a signal at the terminal 186 between these elements, which terminal corresponds to C in Figure 1. The terminal 186 is connected through capacitor 188, which serves to block the switching frequency while passing the exciting frequency, to the resistor 190, the exciting potential developed across which is rectified by the crystal diode 192 which delivers its output to the parallel arrangement of the resistor 194 and capacitor 196. The latter is designed so as to provide a bypass for the exciting frequency component of the output signal while having a time constant which will not suppress the variations in the rectified signal representative of the changes in amplitude during the respective half cycles of switching in the high frequency signal appearing at 186. The signal thus provided, which is essentially that illustrated at E in Figure 3, is delivered to a synchronous detector or servo motor indicated at 200 which additionally receives a signal from terminals 180 through connections 202. What is indicated at 200 may take the form of a synchronous detector of any one of many types, one of which has been described in Figure 1 as involving the triodes 72 and 74 and their connections. Alternatively, what is illustrated at 200 may be a servo motor of the type having a pair of alternating current windings one of which receives the signals delivered through capacitor 198 while the other receives signals delivered through the connections 202. In such case, the servo motor will rotate in a direction corresponding to the phase relationship of the signals E of Figure 3 in relation to the switching signal, the motor coming to rest if the effective amplitude of the signals through 198, indicated at F in Figure 3, becomes zero. Further illustrations of the use of such a servo motor for the purpose of circuit balancing and null measurements will be brought out hereafter.

In the event that the switching signal is not transmitted through the cable, as in Figures 5 and 6, the input at 202 would, of course, be from the supplies of switching signals to transformers 124 or 146.

Reference so far has been particularly made to the effecting of switching through crystal diodes by the application thereto of alternating switching signals. It will be understood that thermionic diodes or other rectifying devices may equally well be used in such circuits. However, the switching at the location of detection may be accomplished in other fashions which may now be described.

Figure 9:
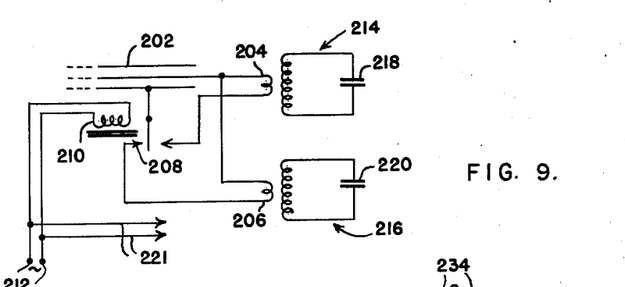
Figure 9 and 10 are wiring diagrams illustrating the use of electromechanical switching at pickups.
Figure 10:
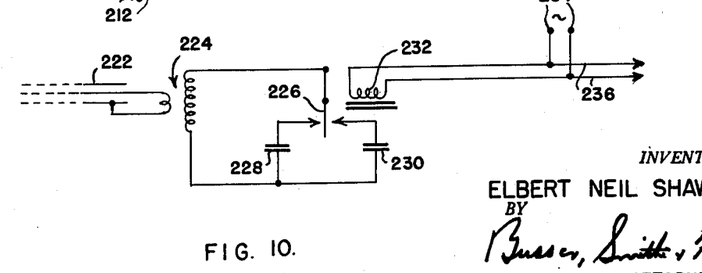

Figures 9 and 10 illustrate switching respectively in the low and high impedance portions of the detection circuit by electromechanical switching means. In Figure 9 the cable is indicated at 202 as connected to transformer primaries 204 and 206 selectively through the operation of a switching relay 208 the operating coil of which, indicated at 210, is energized from the switching signal terminals 212, the relay being of a polarized type. Accordingly, on successive half cycles of the switching signal the primaries 204 and 206 are respectively connected to the source of exciting signal from the cable 202. The primaries 204 and 206 are coupled to the circuits 214 and 216 which contain the capacitances 218 and 220 constituting the reference and the capacitance to be measured. These circuits are the same as those indicated at 148 and 150 in Figure 6. Connections 221 from the signal frequency terminals 212 correspond to the connections 202 illustrated in Figure 8. It will, accordingly, be evident that the arrangement shown in Figure 9 functions in precisely the same fashion as various of the circuits previously described in giving rise to varying amplitude exciting frequency signals at terminals such as C in Figure 1 or 186 in Figure 8. The only difference lies in the fashion in which the switching is accomplished.

Figure 10 illustrates corresponding switching in the high impedance portion of the circuit. Here the cable 222 delivers the exciting current through transformer 224 selectively to the capacitances 228 and 230 as determined by the switching effected by the polarized relay 226, the operating coil of which is indicated at 232 and is excited from the switching terminals 234 which also supply signals through connections 236 to a synchronous detector or servo motor.

Figure 11:
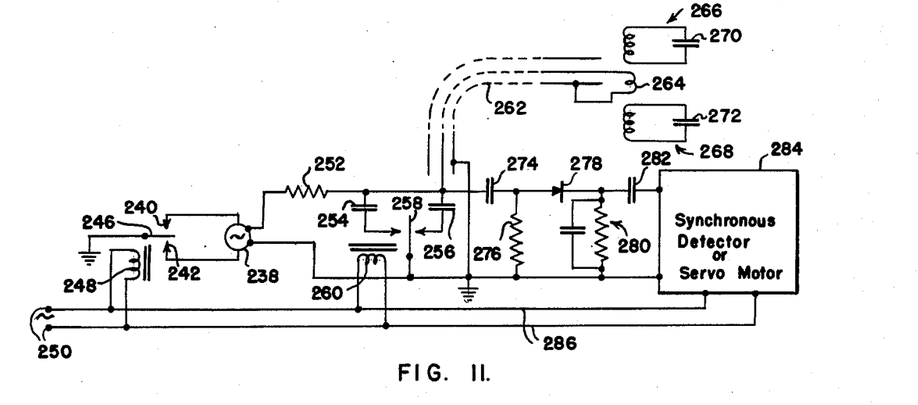
Figure 11 is a wiring diagram showing a system in which switching is effected by a variable frequency control.

Figure 11 represents still another switching arrangement which utilizes for switching a pair of different frequencies of excitation. In this figure, 238 represents any suitable relatively high frequency generator the frequency output of which may be varied depending upon the engagement with either contact 240 or 242 by the armature 246 of a relay the operating coil 248 of which is connected to the switching terminals 250, the relay being of a polarized type. The generator at 238 may take numerous forms, such as a vacuum tube oscillator having its frequency shifted by throwing into the circuit one or the other of a pair of frequency determining tanks, or by having a portion of a capacitance or an inductance cut out of the circuit by grounding. It may also take the form of a multivibrator the frequency of which may be determined by the insertion of alternative resistance values in its frequency-determining circuit. Numerous other types of generators may be thus provided and since they are well known in the art they need not be specifically described. The output from the generator 238 is fed to the voltage-dividing arrangement of resistance 252 and one or the other of capacitances 254 and 256 which may be selectively switched into the circuit by the relay 258, the operating coil of which is connected to the switching signal terminals 250. The purpose of providing the two condensers 254 and 256 which are alternatively switched into the circuit by the polarized relay is to secure better matching to the circuit of the coaxial cable 262 at the two frequencies employed. The coupling coil at the remote end of the cable indicated at 264 is coupled to a pair of circuits 266 and 268 which contain the capacitances 270 and 272 which provide the capacitance to be measured and the reference capacitance. By so providing the circuits 266 and 268 that one of them is operating on the slope of its resonance curve at one of the alternative frequencies and the other is operating on the slope of its resonance curve at the other of the frequencies, a frequency discrimination condition exists such that during the feed of one of the frequencies one of the circuits 266 is effectively in operation while the circuit 268 is effectively out of operation, with an interchange of these conditions at the other frequency. If the circuits 266 and 268 are of high Q type, the two exciting frequencies may be quite close to each other and, consequently, the results of changes of condition of the cable 262 will be essentially the same for both frequencies with a consequent effective elimination of the cable variations from the signal which appears at the input to the condenser 274. The remaining portions of the circuit including resistor 276, crystal diode 278, the RC circuit 280, condenser 282, and the synchronous detector or servo motor 284 are the same as described above in connection with Figure 8 and need not be detailed. The synchronous detector or servo motor is supplied with the switching signal through the connections 286. It will be evident that the requirements of the invention are met by the circuit of Figure 11, the results obtained being substantially the same as heretofore described.

Figure 12:
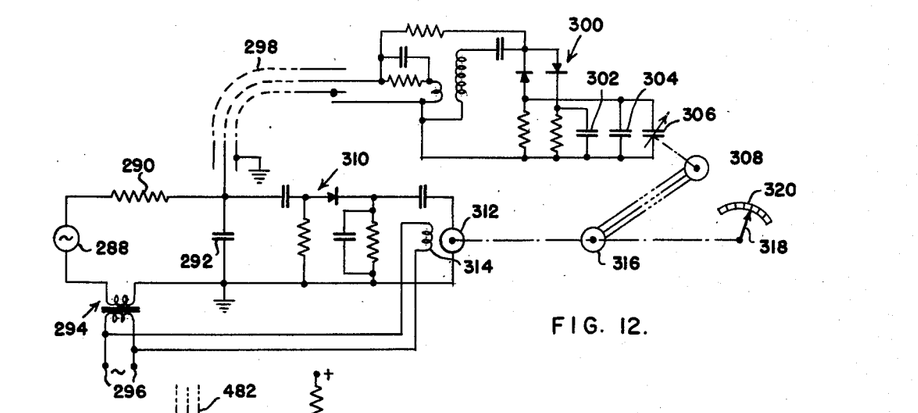
Figure 12 is a wiring diagram illustrating a system involving null operation.

The references heretofore made to the provision of a servo motor will be made clearer by reference to Figure 12 which shows not only a servo motor but a null type of circuit in which the capacitances to be measured and serving as a reference are maintained equal by the association of one of them with a variable capacitance driven through a servo system. In Figure 12, the apparatus at the reading end of the coaxial cable 298 is essentially that illustrated in Figure 8, comprising the exciting frequency generator 288 in series with the secondary of a switching signal transformer 294 excited from the switching terminals 296 and feeding the voltage dividing arrangement of resistor 290 and capacitor 292. The output from the junction of these last elements is fed through the coaxial cable 298 to the detecting circuit 300 which is identical with that previously described and shown in Figure 4 with the exception that one of the capacitances is shunted by a variable condenser 306, the capacitance 304 being shown as thus shunted while the capacitance 302 is independent. Either of the capacitances 302 or 304 may constitute the one undergoing measurement, the other being the reference.

The variable condenser 306 is driven by the selsyn receiver 308 which is connected to the selsyn transmitter 316. The portion of the circuit indicated at 310 is the same as that previously described and shown in Figure 8 but the servo motor 312 is diagrammed. The motor 312 may be of any suitable type provided with one winding which receives the output from the circuit 310 and a second winding 314 which is energized from the switching signal terminals 296. The motor 312 is thus of a type which in the absence of a signal from the circuit 310 remains stationary while it is rotated in one direction or the other depending upon the phase of the signal at switching frequency which is received from the circuit 310. The motor 312 drives the selsyn transmitter 316 and also the pointer 318 shown as moving adjacent to a scale 320 for observation of the setting of the selsyn transmitter and, therefore, of the setting of the variable condenser 306. Instead of merely providing a visual indication, it will, of course, be evident that recording may be provided by driving the element 318 as a stylus to record on a moving paper or similar sheet. The plates of the condenser 306 may be suitably shaped to give linear response or some predetermined non-linear response so that the scale 320 or the corresponding scale of a recorder may be calibrated in terms of some variable which affects the capacitance to be measured.

The operation of Figure 12 will be evident, the drive of the motor 312 resulting in adjustment of the condenser 306 to maintain equality of the combination of capacitances 304 and 306 with the capacitance 302. The servo arrangement which has been described may only provide a null condition of equality of capacitances or may additionally operate an indicator or recorder. But it may, instead, serve to control a process variable which in turn will provide equality of the capacitances constituting the measuring capacitance and the standard, in which case a capacitance such as 306 will not be adjusted, the system then providing a servo motor as indicated at 200 or 284.

Figures 13, 14:
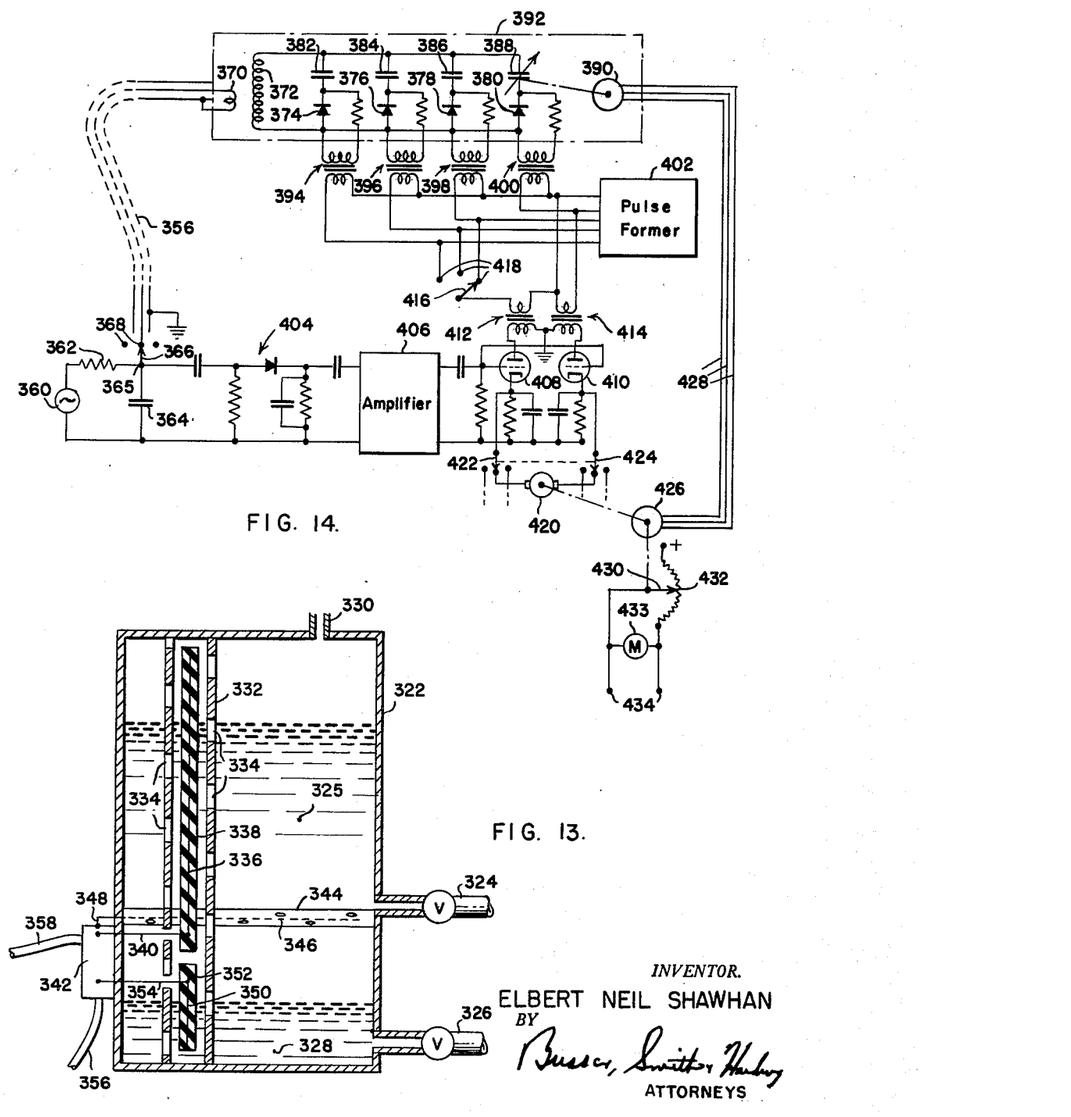
Figure 13 is a sectional diagram illustrating a tank and devices associated therewith for the determination of liquid levels.
Figure 14 is a wiring diagram of electrical apparatus such as may be associated with the tank of Figure 13 for determination of liquid levels.

The description so far has related to the measurement of a single capacitance in comparison with a reference capacitance. There will now be described with particular reference to Figures 13 and 14 a more elaborate system in which there are involved measurements of a plurality of capacitances such as may be required in the measurement of more complex process variables, or the like, or the provision of sufficient data to give rise to measured functions of a plurality of variables. Typical of requirements is the measurement of the quantity of a liquid such as oil in a tank which may contain below the oil a layer of water. Figures 13 and 14 are directed specifically to this problem and will serve to indicate the more general types of problems to which the invention is applicable.

There is indicated at 322 in diagrammatic form a tank which it may be assumed is provided to contain an oil which is subject to possible variation in composition and to temperature variations while in the tank. It may further be assumed that this oil normally overlies a quantity of water such as may be carried by the oil into the tank and settles therein from the oil or may accumulate due to condensation or other causes. The problem presented, then, is the determination of the height of the oil layer and possibly its position in the tank in the event that the tank interior is not cylindrical. This determination, furthermore, must be accurately made irrespective of changes in the oil composition and in the temperature within the tank. The tank is indicated as provided with a valved connection 324 for the introduction and removal of the oil, a valved connection 326 for the removal of accumulated water, and a vent 330. The oil layer is indicated at 325 and the water layer at 328. There is indicated at 332 (in greatly enlarged transverse dimensions relative to the tank as compared with an actual installation) a vertical conducting metallic tube 332 provided with staggered openings 334 sufficing for the free entry and exist of water and oil into and from the tube and insuring a composition of the oil within the tube which is essentially at all times the same as that of the oil external to the tube. Extending axially through the tube 332 is an insulated conductor 336 which may take the form of a metallic rod coated with an inert insulating material 338 such as Teflon. The thickness of this insulating coating is greatly exaggerated in Figure 13 for clarity, and desirably the coating is relatively thin so as to provide a minimum of dielectric. The conductor 336 at its upper end extends above the highest level of oil which may properly be present in the tank and terminates at its lower end at a level which will always be above the highest level of the oil-water interface which will be permitted, being at the same time below the lowest level of oil permitted. A lead 340 from the conductor 336 extends to a box 342 external to the tank which contains various elements hereafter described.

Extending transversely within the tank and at a level such that it is always submerged in the oil is a conductive tube 344 which contains an insulated conductor 346, the tube 344 being provided with openings for the influx of oil to its interior. The arrangement may be identical with that already described involving the tube 332 and the conductor 336. The difference is that the tube 344 is always submerged so that the capacity provided by its assembly is independent of the oil level. As will appear, this provides a reference capacity which may vary with the oil composition and its temperature in the same fashion as the capacity varies with those factors in the assembly including tube 332. A lead 348 from the conductor 346 leads into the box 342.

In the lower end of the tube 332 there is located an insulated conductor 350, its insulation being exaggeratedly indicated at 352. The conductor 350 embraces a vertical region within which the level of the oil-water interface will normally vary. A capacity is here provided which varies with the change of level of this interface, the water 328 being practically always sufficiently impure to be a good conductor and, accordingly, forming the external plate of a condenser having as its inner plate the conductor 350 and as its dielectric the insulating material 352. In general, therefore, the effective capacity involved is that of the assembly below the oil-water interface, the relatively smaller capacity above this interface being negligible or readily taken into account. A lead 354 passes from the conductor 350 into the box 342. A coaxial cable 356 is indicated as leading from the box 342, and there is also a cable 358 leading therefrom which, as will immediately appear, contains selsyn transmitting and other conductors.

Reference may now be made to Figure 14 which shows the electrical connections which are provided in connection with the tank arrangement of Figure 13. There is indicated at 360 an exciting generator of higher frequency signals such as has been discussed previously. The voltage divider arrangement of resistor 362 and capacitor 364 provides a terminal 365 which may be selectively connected by a switch 366 to any one of a group of terminals 368 of coaxial cables connected to various tanks of a group, there being shown a connection to the coaxial cable 356 of one tank which may be assumed to the one previously described. The opposite end of this coaxial cable 356 is connected to the primary of a transformer 370 the secondary 372 of which has connected across it in series the respective pairs of diodes 374, 376, 378 and 380 and corresponding capacitances 382, 384, 386 and 388. The last capacitance may take the form of a variable condenser the movable plates of which are arranged to be driven by the selsyn receiver 390. The chain line 392 surrounding various of the described elements indicates those which are local to the tank and provided by the structure already described or the apparatus which is located within the box 342.

Of the capacitances 382, 384 and 386, one may be provided by the combination of the tube 332 and conductor 336, a second by the combination of the water 328 and the conductor 350, and the third by the combination of the tube 344 and the conductor 346. As will appear, these several capacitances are individually compared with the variable capacitance provided at 388.

Switching signals are provided through the transformers 394, 396, 398 and 400 from a pulse former which is indicated at 402 and may take various forms, the pulse former providing a series of pulses which sequentially are provided to the several transformers. This pulse former may take numerous forms well known in the art and since, in itself, it constitutes no part of the invention, it need not be described in detail. The series of pulses mentioned may conveniently be provided by supplying to the pulse former an alternating current at, for example, 60 cycles, providing therefrom two quadrature sine waves, and selecting the positive and negative peaks of these waves to provide the series of four switching pulses. The connections of the transformers through individual resistances to the diodes 374, 376, 378 and 380 will be recognized as providing switching to put into the circuit of the secondary of the transformers 370, 372 in time sequence the various capacitances 382, 384, 386 and 388.

Connected to the terminal 365 there is the circuit 404 which will be recognized as essentially that shown in Figure 1 or Figure 8, giving rise through the amplifier 406 to signals in the synchronous detecting arrangement of triodes 408 and 410 as previously described. To the anodes of the triodes 408 and 410 there are delivered synchronous switching signals, to the former through transformer 412, and to the latter through transformer 414. The primary of the latter is connected to the input to the primary of transformer 400 which is connected to the circuit involving the variable condenser 388. The primary of the transformer 412 may be selectively connected through switch 416 and contacts 418 to the inputs to the transformers 394, 396 and 398.

The output of the synchronous detector is selectively fed through switches 422 and 424 to a series of motors corresponding to the various tanks which may be switched into the system by the switch 366. The motor 420 which is illustrated corresponds to the tank under consideration and is driven in one or the other directions, as previously described, depending upon the sign of the synchronous switching output. The motor 420 drives the selsyn transmitter diagrammed at 426 which is connected at 428 to the selsyn receiver 390. The selsyn transmitter 426 also drives the movable contact 430 of a potentiometer 432 to provide a reading on a meter 433 or a remote D.C. signal through terminals 434 which may be used for recording or may lead to a memory system to retain the output signal.

The operation of the system shown in Figure 14 will now be apparent. When the switch 416 engages the contact 418 corresponding to any one of the capacitances 382, 384 and 386, the operation of the system will be as previously described to drive the variable capacitance 388 into correspondence with that particular capacitance. The signal readable on meter 433 or delivered through terminals 434 will then constitute by its magnitude a measure of the particular capacitance. By thus securing readings of the three capacitances 382, 384 and 386 by selective manipulation of the switch 416, the respective readings will, as determined from previous calibrations, give the levels of the oil surface and the oil-water interface and also a correction reading which will be indicative of temperature and compositional changes. From the readings thus obtained, the true levels may be calculated, thereby giving ultimately the quantity of oil in the tank and also the quantity of the underlying water therein. It will be evident that the system may be made as elaborate as desired, including the provision of inputs to an automatic calculating circuit which may give directly the ultimate results without necessitating calculation.

Figure 15:
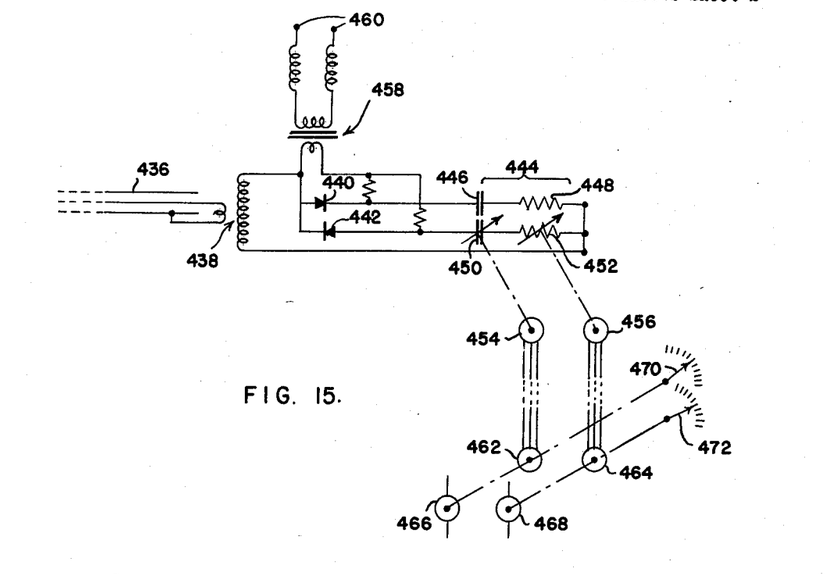
Figure 15 is a wiring diagram illustrating the applicability of the invention to the measurement of more elaborate impedances such as may be encountered in various instances.

Mention has been made heretofore of the possibility of measurement, in the broad sense, of impedances which may be substantially more elaborate than the impedances provided merely by single capacitances or inductances. Figure 15 illustrates a system in which null-type measurements may be made of an impedance containing, for example, reactive and resistive components.

A coaxial cable 436 has its pickup end coupled through transformer 438 to the diodes 440 and 442 arranged in a circuit which is essentially that of Figure 5 with the exception that instead of the capacitance 130 there is provided an impedance indicated at 444 which is illustrated as involving a capacitance 446 in series with a resistance 448. Similarly, the capacitance 132 is replaced by the variable capacitance 450 and the variable resistance 452 which are indicated as respectively connected to the selsyn receivers 454 and 456. Switching signals are provided through transformer 458 from terminals 460 in the same fashion as in Figure 5. If the selsyn receivers 454 and 456 are respectively driven by selsyn transmitters 462 and 464 which are, in turn, respectively driven by motors 466 and 468 corresponding to the motor 312 in Figure 12 and selectively arranged for switching into the type of detecting circuit illustrated in Figure 12 (with the switching signal input at transformer 294 omitted), it will be evident that by switching alternatively into the circuit the motors 466 and 468 there will occur, by a converging process, adjustments of the variable capacitance 450 and the variable resistance 452 to cause them to correspond to the reactive and resistive components of the impedance 444. Adjustment of only one of the pair of capacitance 450 and resistance 452 could not in an instance such as this lead to a null output signal. But by the use of the apparatus as described, a final null balance can be achieved whereupon the final values of the reactance and resistance components of the impedance may be indicated by the pointers 470 and 472 driven, respectively, with the selsyn transmitters 462 and 464. Such an arrangement is particularly useful in situations where an impedance to be measured has both reactive and resistive components, an example being a situation in which a wet material is passed as a dielectric between condenser plates, there being exhibited in such case an impedance having both components arising out of the quantity of the material passing and its water content. In many other instances, it is found that a material serving as a dielectric of a condenser will exhibit both components.

Figure 16:
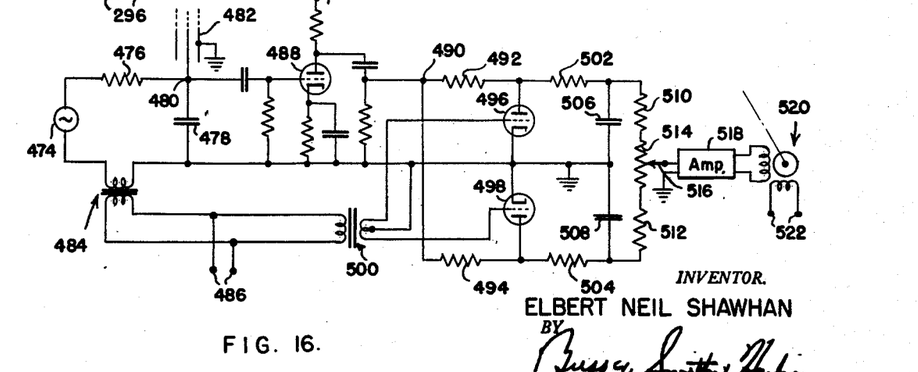
Figure 16 is a wiring diagram showing a system for the maintenance of a selected reactance ratio.

In many instances it is desirable to maintain a reactance, such as a capacitance, in a definite ratio with a given similar reactance, or to give an indication of a ratio which exists between a pair of reactances. The circuit illustrated in Figure 16 is capable of satisfying these ends, and also shows, in particular, a further arrangement of detector of more general applicability.

An exciting frequency is provided by a generator 474 of a type such as previously discussed, and through the voltage dividing arrangement of resistor 476 and capacitor 478 provides at terminal 480 an excitation which is delivered through the coaxial cable 482 which may be connected to any of the types of pickup circuits previously discussed embodying the reactances which are to be compared. In the event that the switching potential is to be provided over the coaxial cable, a switching transformer 484 energized from the switching signal terminals 486 may be provided. If the switching signal is to be provided independently of the cable, this may be done in one of the fashions previously described.

The signal appearing at the terminal 480 is amplified by the amplifying circuit including the triode 488 and the output of this amplifier appearing at terminal 490 is applied through resistors 492 and 494 to the anodes of respective triodes 496 and 498. The cathodes of these triodes are connected together and the grids are supplied with voltages of opposite phase from the transformer 500 receiving an input from the switching signal terminals 486. The anodes are connected through resistors 502 and 504 to the ungrounded terminals of capacitors 506 and 508, which terminals are also connected to the series arrangement of resistors 510 and 512 and the resistance 514 of a potentiometer having an adjustable contact 516. The last contact is connected to the input terminals of an amplifier 518 which supplies one winding of a reversible phase-sensitive motor 520, the other winding of which is connected to the terminals 522 receiving the switching signal.

In this arrangement, synchronous detection of the high frequency signals received from the reference capacitance and that to be measured are detected by reason of the grounding action of the triodes 496 and 498 as their respective grids are rendered positive to cause them to conduct. The result is that pulses of different amplitudes appear at the ungrounded terminals of the condensers 506 and 508, the time constants of the combinations 502 and 506 and 508 and 504 being such as to smooth out the signals to remove the exciting frequency but, nevertheless, retain the pulses at the switching frequency. Adjustment of potentiometer contact 516 delivers to the amplifier 518 a signal at the switching frequency which will be zero only when the pulses which appear at the ungrounded terminals of condensers 506 and 508 are related in a ratio corresponding to the resistances appearing at opposite sides of the potentiometer contact 516. By causing the output of the amplifier to drive reversely the motor 520, this motor may be made to control a process variable such as to maintain the ratio set by the potentiometer contact. Alternatively, the motor may drive the potentiometer contact whereupon its position will indicate the ratio of the capacitances which exists.

What is claimed is:

1. An impedance measuring apparatus comprising a pair of impedances at least one of which is variable, said impedances having values of the same order of magnitude, means providing with said impedances individually a pair of circuits having similar characteristics, a common transmission line electrically associated at one of its ends with said circuits, said transmission line having a total distributed capacitance such that uncontrollable changes of reactance may be expected therein in excess of changes in magnitude of said impedances to be measured, means providing through said transmission line alternating excitation current to said circuits, and means electrically associated with the other end of said transmission line and responsive through the transmission line to said circuits to provide an output indicative of the electrical relationship of said impedances, the foregoing apparatus including means for cyclically rendering said circuits alternately effective, at a cycling frequency substantially less than the excitation current frequency, to determine the response of said output providing means.

2. Apparatus according to claim 1 in which said impedances are provided by capacitances.

3. Apparatus according to claim 2 in which said capacitances have similar structural configurations.

4. Apparatus according to claim 1 in which the means for cyclically rendering said circuits alternately effective comprises a pair of diodes reversely associated with said circuits and means for providing polarizing potentials across said diodes to render them alternately conductive.

5. Apparatus according to claim 4 in which signals providing said polarizing potentials are transmitted to said diodes through said common transmission line.

6. Apparatus according to claim 1 in which the means for cyclically rendering said circuits alternately effective comprises a switching relay associated with said circuits and means for cyclically energizing said relay.

7. Apparatus according to claim 1 in which the means for cyclically rendering said circuits alternately effective provides through the transmission line exciting currents of different frequencies to said circuits, and in which said circuits are tuned for selective responses to said different frequencies.

8. Apparatus according to claim 1 in which said output providing means includes means synchronized with the last mentioned means to provide a signal varying with variations of one of said impedances.

9. Apparatus according to claim 1 in which said output providing means includes a rectifier responsive to current at the excitation current frequency to give rise to a signal having a component at the cycling frequency.

10. Apparatus according to claim 1 in which means controlled by said output adjusts one of said impedances.

References Cited in the file of this patent

UNITED STATES PATENTS

| | | |
|---|---|---|
| 2,508,478 | Uehling | May 23, 1950 |
| 2,525,675 | Heller | Oct. 10, 1950 |
| 2,535,027 | Anderson | Dec. 26, 1950 |
| 2,597,088 | Dutilh | May 20, 1952 |
| 2,651,940 | Kline | Sept. 15, 1953 |
| 2,677,804 | Foster et al. | May 4, 1954 |
| 2,769,957 | Zito et al. | Nov. 6, 1956 |

FOREIGN PATENTS

| | | |
|---|---|---|
| 569,279 | Great Britain | May 16, 1945 |

OTHER REFERENCES

Keistec et al.: The Design of Switching Circuits, copyright 1951, pp. 214–217.